(12) United States Patent
Clark et al.

(10) Patent No.: US 8,128,823 B2
(45) Date of Patent: Mar. 6, 2012

(54) TREATMENT ASSEMBLIES

(75) Inventors: Andrew Christopher Clark, Blythe Bridge (GB); Fredrick John Burton, Newport (GB)

(73) Assignee: Fairey Industrial Ceramics Limited, Longton (GB)

( * ) Notice: Subject to any disclaimer, the term of this patent is extended or adjusted under 35 U.S.C. 154(b) by 602 days.

(21) Appl. No.: 12/293,168

(22) PCT Filed: Mar. 16, 2007

(86) PCT No.: PCT/GB2007/000944
§ 371 (c)(1),
(2), (4) Date: Dec. 16, 2008

(87) PCT Pub. No.: WO2007/107719
PCT Pub. Date: Sep. 27, 2007

(65) Prior Publication Data
US 2009/0084724 A1   Apr. 2, 2009

(30) Foreign Application Priority Data
Mar. 17, 2006 (GB) .................................. 0605382.1

(51) Int. Cl.
*B01D 29/15* (2006.01)
*B01D 29/52* (2006.01)

(52) U.S. Cl. .................. 210/323.2; 210/345; 210/347; 210/444; 210/450

(58) Field of Classification Search .................. 210/232, 210/323.1, 323.2, 345, 347, 440, 443, 444, 210/450
See application file for complete search history.

(56) References Cited

U.S. PATENT DOCUMENTS

| 2,440,487 | A | * | 4/1948 | Rayburn | 210/345 |
| 2,921,686 | A | * | 1/1960 | Forman et al. | 210/323.2 |
| 4,319,997 | A | * | 3/1982 | Pett | 210/443 |
| 5,149,431 | A | * | 9/1992 | Coen | 210/323.2 |
| 5,328,609 | A | | 7/1994 | Magnusson et al. | |
| 5,580,456 | A | | 12/1996 | Bowlsbey | |
| 2004/0065627 | A1 | * | 4/2004 | Loser | 210/323.2 |
| 2004/0159600 | A1 | | 8/2004 | Stankowski | |

FOREIGN PATENT DOCUMENTS

| EP | 0150559 | 8/1985 |
| EP | 1031810 | 8/2000 |
| EP | 1380332 | 1/2004 |

* cited by examiner

*Primary Examiner* — Christopher Upton
(74) *Attorney, Agent, or Firm* — Chernoff, Vilhauer, McClung & Stenzel

(57) ABSTRACT

A fluid treatment assembly defines a treatment chamber and includes a treatment sub assembly positioned in an assembled condition in the treatment chamber. The treatment sub assembly includes a plurality of treatment members. The treatment assembly is arranged so that in use a fluid for treatment flows through the treatment members.

8 Claims, 5 Drawing Sheets

TREATMENT ASSEMBLIES

This is a national stage application filed under 35 USC 371 based on International Application No. PCT/GB2007/000944 filed Mar. 16, 2007, and claims priority under 35 USC 119 of United Kingdom Patent Application No. 0605382.1 filed Mar. 17, 2006.

The present invention relates to treatment assemblies, particularly but not exclusively treatment assemblies for treating fluids such as water.

Treatment assemblies for treating fluids such as water conventionally include a treatment sub assembly which is releasably mounted within a treatment chamber. The treatment sub assembly includes treatment material for treating the fluid. In use, over a period of time, the treatment material loses its effectiveness and must be replaced. The through flow capacity of the treatment material is dependent upon the surface area of the treatment material. The treatment sub assembly must be replaced on a regular basis, and during replacement, the supply of fluid through the treatment assembly must be stopped. However, the treatment sub assembly can be difficult to detach, leading to longer downtime of the system and greater maintenance costs.

According to a first aspect of the present invention, there is provided a treatment assembly, the treatment assembly defining a treatment chamber, the treatment assembly including a treatment sub assembly positioned in an assembled condition in the treatment chamber, the treatment sub assembly including a plurality of treatment members, the assembly being arranged so that in use a fluid for treatment flows through the treatment members.

According to a second aspect of the present invention, there is provided a treatment sub assembly for positioning in an assembled condition within a treatment chamber defined by a treatment assembly, the treatment sub assembly including a plurality of treatment members, the assembly being arranged so that in use a fluid for treatment flows through the treatment members.

Possibly, the treatment members are arranged so that in use, the fluid flows through the treatment members in parallel flow, Possibly, the treatment sub assembly defines a manifold chamber, and may be arranged so that the fluid flows through the manifold chamber and the treatment members.

Possibly, the treatment sub assembly extends along an axis, and may be symmetrical about the axis.

Possibly, each treatment member is substantially cylindrical. Possibly, the treatment members are arranged radially around the axis, and may be radially equispaced.

Possibly, the treatment sub assembly includes a manifold, which defines the manifold chamber.

Possibly, the treatment sub assembly includes first mounting means for mounting each treatment member to the manifold. Possibly, the first mounting means releasably mount the treatment members to the manifold. Possibly, the first mounting means permit communication of the fluid between the treatment members and the manifold chamber.

Possibly, the first mounting means include first spigot formations, one first spigot formation projecting from each of the treatment members.

The first mounting means may include a plurality of first sockets formations, which may be formed by the manifold, and in which the first spigot formations may be receivable.

The treatment sub assembly may include first sealing means for sealing between each treatment member and the manifold. The first sealing means may include a plurality of first resilient sealing members, each of which may be in the form of an O-ring.

Possibly, the treatment assembly includes a body and a chamber wall. Possibly, the body and the chamber wall together define the treatment chamber. Possibly, the body defines inlet and outlet passages for communicating fluid to and from the treatment chamber. The treatment assembly may include wall mounting means for releasably mounting the chamber wall to the body.

Possibly, the treatment sub assembly includes second mounting means for mounting the treatment sub assembly to the body. Possibly, the second mounting means releasably mount the treatment sub assembly to the body. Possibly, the second mounting means permit communication of the fluid between the treatment sub assembly and the body.

Possibly, the second mounting means include a second spigot formation, which may project from the manifold. Possibly, the body includes a second socket formation, which may receive the second spigot formation.

Possibly, the second mounting means include a support member, which may extend from the manifold, and may extend along the axis.

Possibly, the support member may be in the form of a substantially hollow tube.

Possibly, the second mounting means include buffer means, which may include a resilient buffer member. The treatment sub assembly may be arranged so that the buffer member is compressed axially in use. The buffer member may be in the form of a washer.

The buffer means may include a buffer formation, which may be located at an end of the support member away from the manifold. The buffer formation may define a buffer channel in which the buffer member is located.

The treatment sub assembly may include second sealing means for sealing between the treatment sub assembly and the body. The second sealing means may include a second resilient sealing member.

The treatment sub assembly may be arranged so that the second resilient sealing member is compressed substantially radially relative to the axis in the assembled condition. The second resilient sealing member may be in the form of an O-ring.

Alternatively the treatment sub assembly may be arranged so that the second resilient sealing member is compressed along the direction of engagement of the treatment sub assembly with the body in the assembled condition. The second resilient sealing member may be in the form of a washer.

Possibly, the body includes a sealing formation, which may project from the body to compress the second sealing member in the assembled condition.

Possibly, the chamber wall includes a locating formation, which may locate an end of the support member in the assembled condition.

The locating formation may include a projecting formation, against which the buffer member may be substantially compressed in the assembled condition.

The treatment members may include treatment material, which may be porous.

Possibly, the treatment members treat the fluid physically, and may filter the fluid. The treatment material may include a ceramic material, which may be kieselguhr.

The treatment members may alternatively or additionally treat the fluid chemically, and the treatment material may include a carbon material, and/or any other suitable treatment material. The other treatment material may include an ion exchange resin.

Possibly, the treatment assembly is for the treatment of liquid, and may be for the treatment of water. Possibly, the treatment assembly is suitable for domestic use.

According to a third aspect of the present invention, there is provided a treatment assembly, the treatment assembly defining a treatment chamber, the treatment assembly including a treatment sub assembly positioned in an assembled condition in the treatment chamber, the treatment assembly including a body, the treatment sub assembly including second sealing means for sealing between the treatment sub assembly and the body, the second sealing means including a second resilient sealing member, the treatment sub assembly being arranged so that the second resilient sealing member is compressed along the direction of engagement of the treatment sub assembly with the body.

Possibly, the treatment assembly includes any of the features defined in the preceding paragraphs.

According to a fourth aspect of the present invention, there is provided a treatment sub assembly for positioning in an assembled condition within a treatment chamber defined by a treatment assembly, the treatment assembly including a body, the treatment sub assembly including second sealing means for sealing between the treatment sub assembly and the body, the second sealing means including a second resilient sealing member, the treatment sub assembly being arranged so that the second resilient sealing member is compressed along the direction of engagement of the treatment sub assembly with the body.

Possibly, the treatment sub assembly includes any of the features defined in the preceding paragraphs.

Embodiments of the present invention will now be described, by way of example only, and with reference to the accompanying drawings, in which:—

Figure 1:
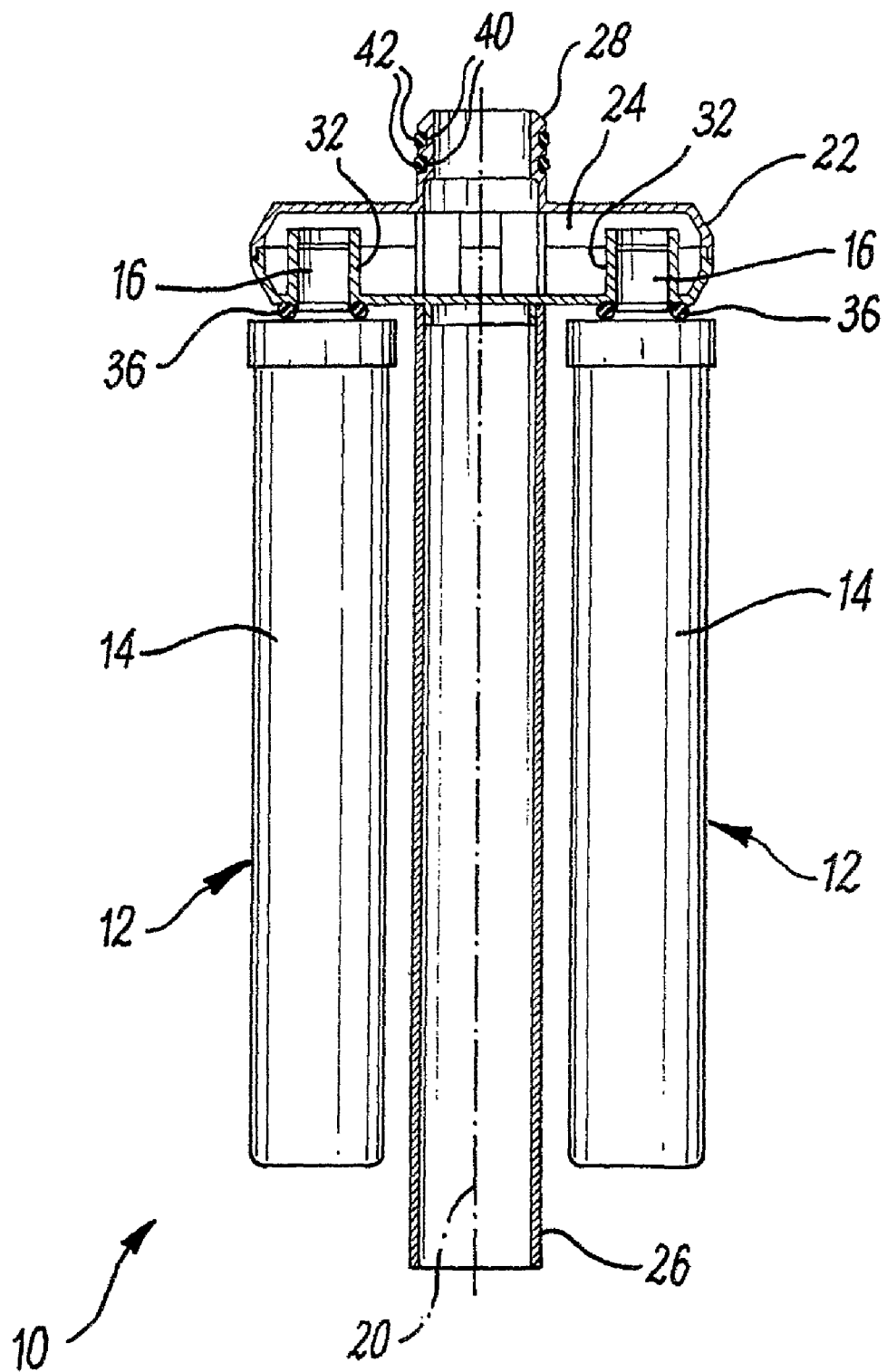
FIG. 1 is a cross sectional side view of a treatment sub assembly.

FIG. 1 shows a treatment sub assembly 10, the treatment sub assembly 10 including a plurality of treatment members 12. Each treatment member 12 includes a substantially cylindrical treatment body 14 formed of a treatment The treatment sub assembly 10 includes a manifold 22 which defines a manifold chamber 24.

The treatment sub assembly 10 includes first mounting means for releasably mounting each treatment member 12 to the manifold 22. The first mounting means include first spigot formations 16, one first spigot formation 16 projecting from each of the treatment members 12.

The first mounting means include a plurality of first socket formations 32 which are formed by the manifold 22, and in which the first spigot formations 16 are receivable. The first spigot formations 16 could include threaded formations which engage with threaded formations formed on the first socket formations 32.

The treatment sub assembly 14 includes first sealing means, which may include a plurality of first sealing members 36. Each first sealing member 36 is formed of a resilient material such as rubber or a plastics material, and is in the form of an O-ring. Each first sealing member 36 locates around one of the first spigot formations 16 to seal between the treatment member 12 and the manifold 22.

The treatment sub assembly 10 includes second mounting means, the second mounting means including a second spigot formation 28 which projects from the manifold 22.

The treatment sub assembly 10 includes second sealing means for sealing between the treatment sub assembly 10 and the body 52, the second sealing means including, in this example, a pair of spaced second sealing members 42, which are formed of a resilient material such as rubber or a plastics material and could be in the form of O-rings. Each of the second sealing members 42 locates in a seal channel 40 defined by the second spigot formation 28.

The second mounting means include a support member 26 in the form of a substantially hollow tube, which extends from the manifold 22, on an opposite side of the manifold 22 to the second spigot formation 28.

Figure 3:
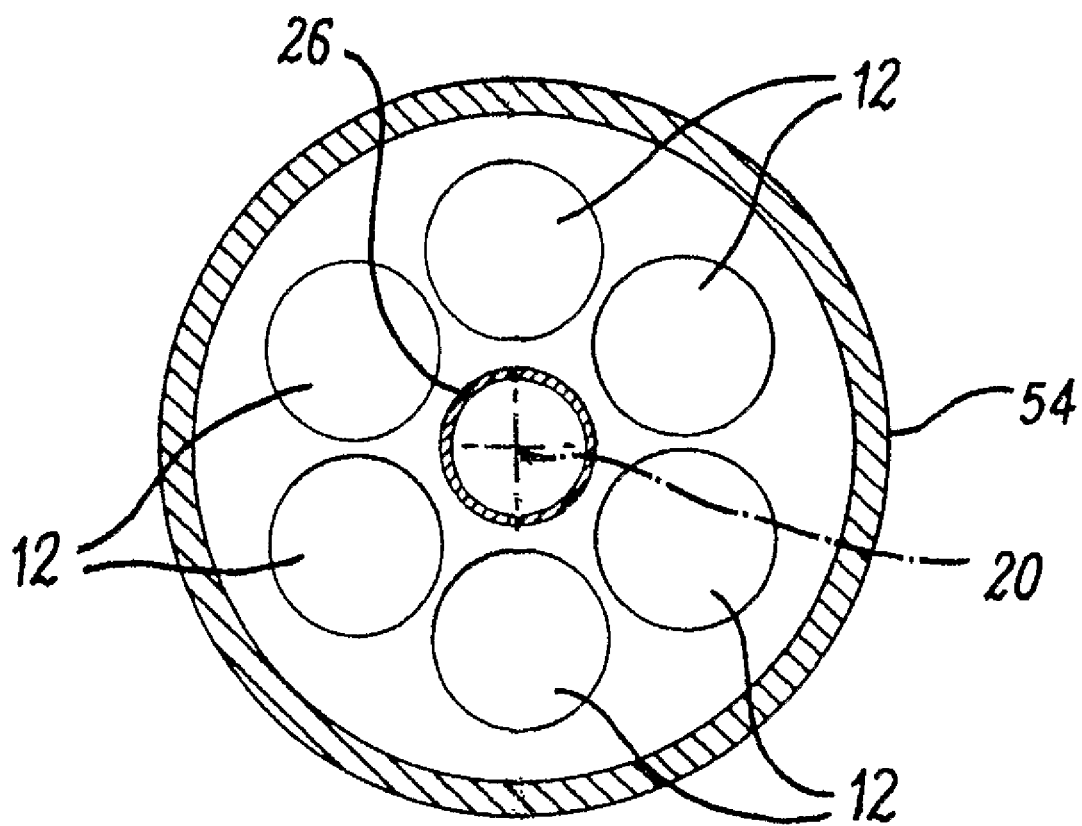
FIG. 3 is a cross sectional plan view of part of the treatment assembly.

The treatment sub assembly 10 extends substantially along an axis 20. The second spigot formation 28, the manifold 22, and the support member 20 each extend along the axis 20. As shown in FIG. 3, the treatment members 12 are arranged radially equispaced around and from the axis 20.

Figure 2:
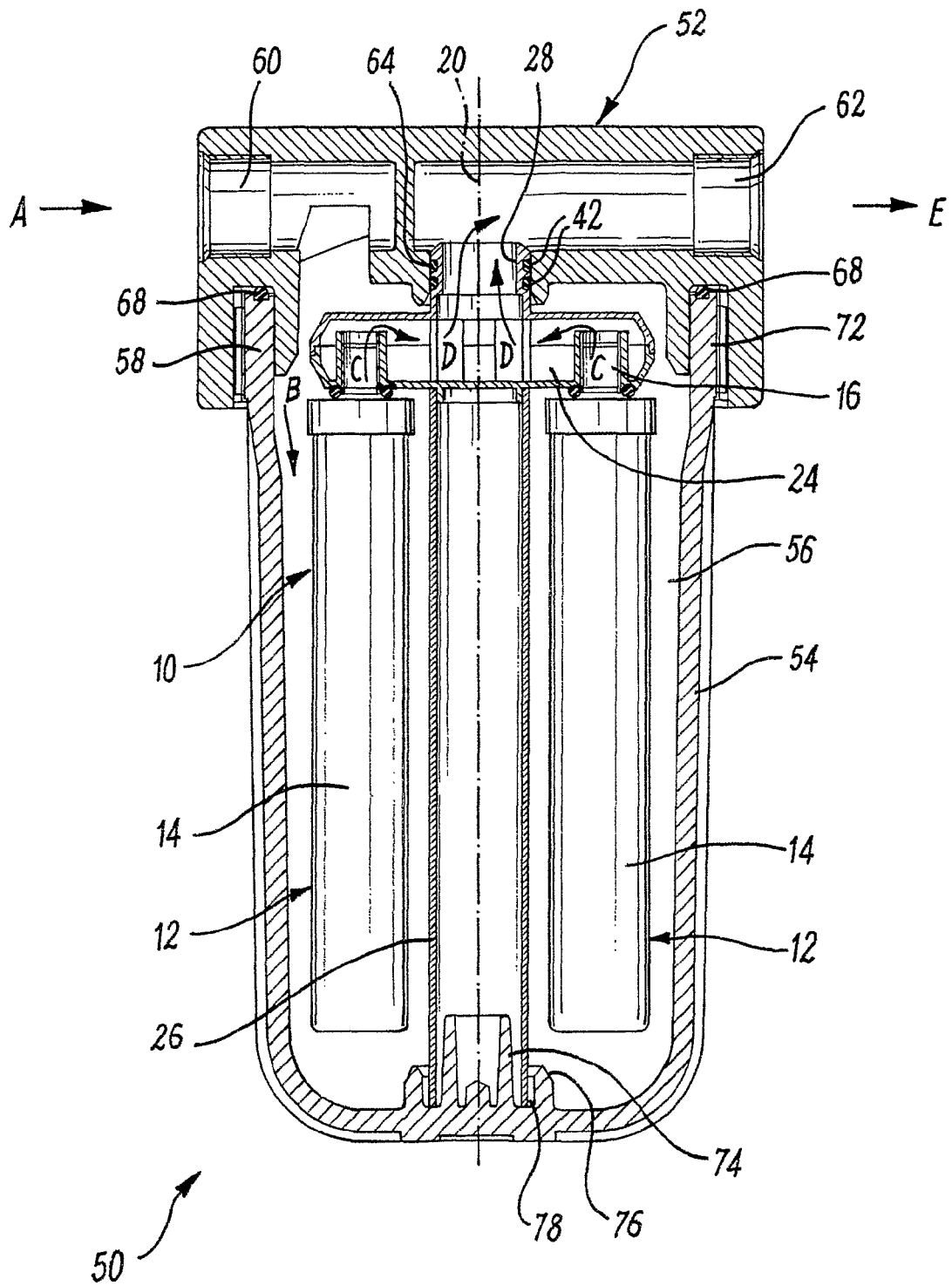
FIG. 2 is a cross sectional view of a treatment assembly.

Referring to FIG. 2, a treatment assembly 50 includes a body 52 and a chamber wall 54, which together define a treatment chamber 56. The body 52 defines inlet and outlet passages 60, 62 for communicating fluid to and from the treatment chamber 56.

The treatment assembly 50 includes wall mounting means for releasably mounting the chamber wall 54 to the body 52. The wall mounting means include a wall receiving channel 72 in which a rim 58 of the chamber wall 54 is receivable. The chamber wall 72 could include a threaded formation which engages a threaded formation formed by the body 52. The threaded wall mounting means allow the chamber wall 54 to be quickly and easily mounted and dismounted from the body 52.

The body 52 includes a second socket formation 64.

The chamber wall 54 includes a locating formation 74 and a projecting formation 76, a locating channel 78 being defined between the locating formation 74 and the projecting formation 76. The locating formation 74 and the projecting formation 78 are annular in plan around the axis 20.

In a disassembled condition, the body 52, the chamber wall 54 and the treatment sub assembly 10 are separate. The treatment assembly 50 is assembled as follows. The second spigot formation 28 of the treatment sub assembly 10 is inserted within the second socket formation 64 of the first spigot formations 16 as shown by arrow C into the manifold chamber 24, through the second spigot formation 28 as shown by arrows D and out through the outlet passage 62 as indicated by arrow E.

In use, in the assembled condition, a fluid such as water flows through the inlet passage 60 as shown by arrow A into the treatment chamber 56 as shown by arrow B, through the treatment material body 14 of the treatment members 12, through the first spigot formations 16 as shown by arrow C into the manifold chamber 24, through the second spigot formation 28 as shown by arrows D and out through the outlet passage 62 as indicated by arrow E.

When the treatment material bodies 14 have lost their effectiveness because of, for instance, blocking, the treatment assembly 50 can be quickly disassembled by unscrewing the chamber wall 54 from the body 52 and removing the treatment sub assembly 10 from the body 52. A new treatment sub assembly 10 can then be positioned and the treatment assembly 50 assembled. The ease of exchange of the treatment sub assembly 10 makes the arrangement particularly suitable for domestic applications, or applications where downtime of the system must be minimised.

The used treatment sub assembly 10 can be reconditioned by removal of the treatment members 12 from the manifold 22, and new treatment members 14 mounted to the manifold 22.

The fluid flows through the treatment members 12 in parallel flow. Thus the treatment surface area available is the sum of the surface areas of all of the treatment material bodies 14. The plurality of relatively small treatment members 12 provides a relatively high ratio of surface area to volume, providing a relatively high available surface area for treatment, which permits in turn a relatively high flow rate of fluid through the treatment assembly 50 in comparison with a treatment assembly having for example a single relatively large treatment member.

Figure 4:
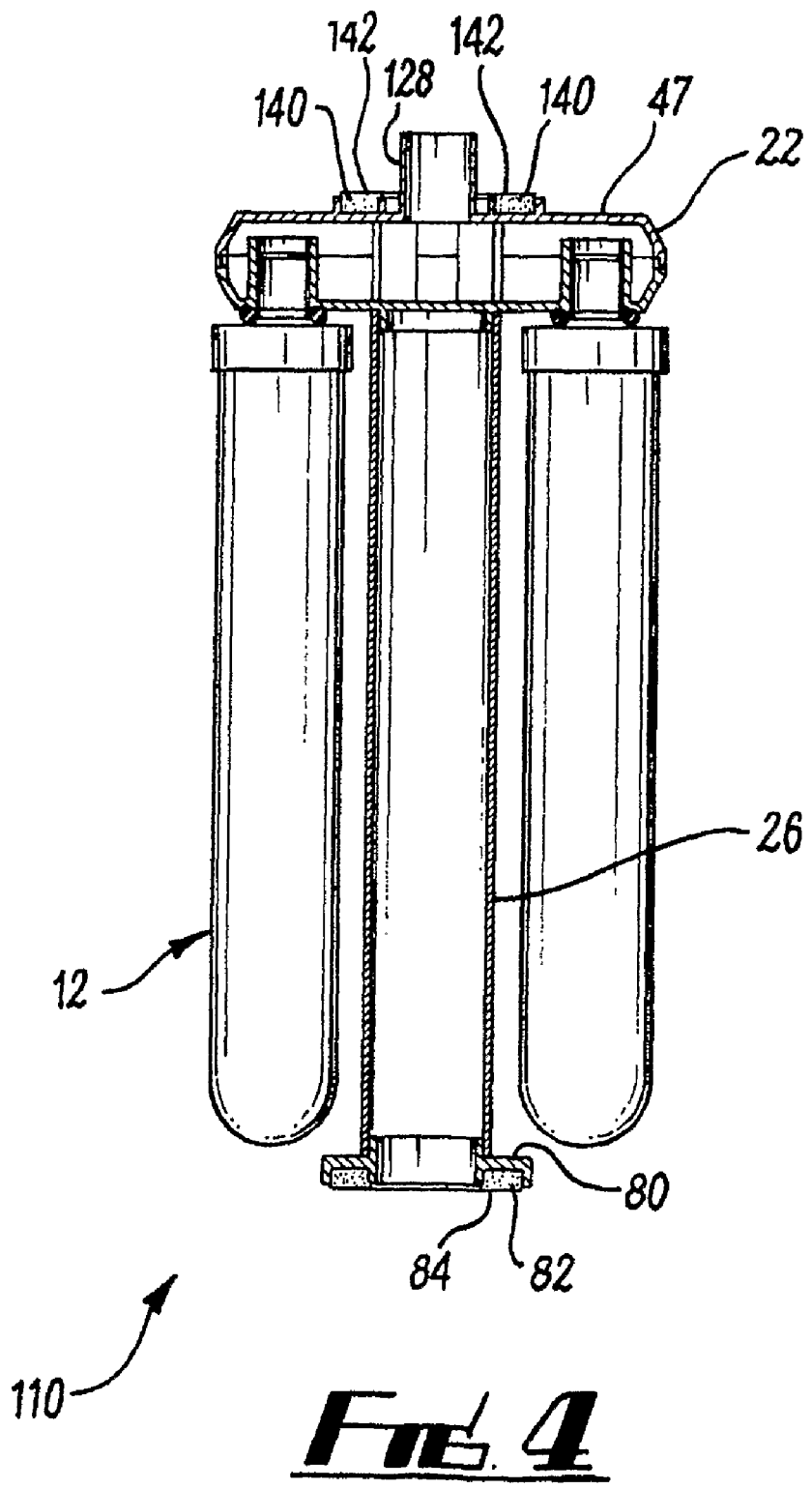
FIG. 4 is a cross sectional side view of another treatment sub assembly.
Figure 5:
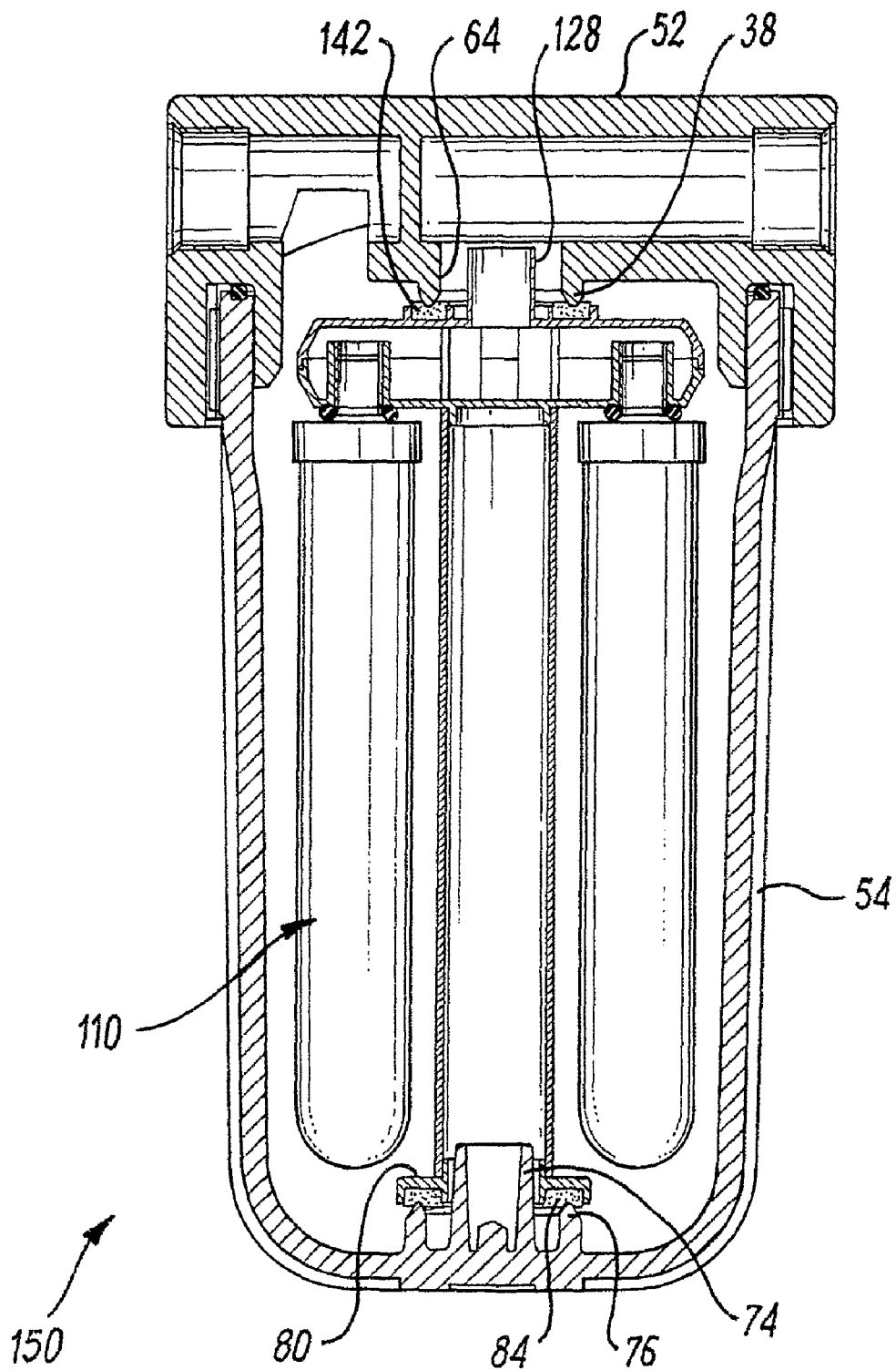
FIG. 5 is a cross sectional side view of another treatment assembly.

FIG. 4 shows another treatment sub assembly 110, and FIG. 5 shows another treatment assembly 150, many features of which are similar to those described previously. For the sake of brevity, only those features which are different to those previously described will now be described.

The treatment sub assembly 110 includes second spigot formation 128 which projects from the manifold 22.

The treatment sub assembly 110 includes second spigot formation 80 which projects from the manifold 22.

The treatment sub assembly 110 includes second mounting means including buffer means, the buffer means including a buffer formation 80 which is located at an end of the support member 26 away from the manifold 22. The buffer formation 80 defines a buffer channel 82 in which a buffer member 84 is located, the buffer member 84 being formed of a resilient material such as rubber or a plastics material. The buffer member 84 is in the form of a washer.

The treatment sub assembly 110 is assembled to a body 52 and a chamber wall 54 in a manner similar to that previously described to form the treatment assembly 150.

The body 52 includes an annular sealing formation 38 which projects from the body around the second socket formation 64.

In assembling the treatment assembly 150, the second spigot formation 128 is located within the second socket formation 64. It will be noticed that, in contrast with the example shown in FIG. 2, the second spigot formation 28 is a relatively loose fit within the second socket formation 64. The sealing formation 38 is located against the second sealing member 142.

The chamber wall 54 is mounted to the body 52 as previously described. In this example, the locating formation 74 locates within the hollow support member 26, and the projecting formation 76 locates against the resilient buffer member 84. As the chamber wall 54 is tightened to the body 52, the buffer member 84 and the second sealing member 142 are axially compressed, ie along the direction of engagement of the treatment sub assembly 110 with the body 52, the second sealing member 142 forming a seal between the manifold 22 and the body 52.

The arrangement of FIGS. 1 and 2, is dependent for sealing between the sub assembly 10 and the body 52 on the accuracy of the size of the second spigot formation 28 relative to the second socket formation 64. In practice there are variations in the sizes of second socket formations 64 produced by different manufacturers, making it difficult to provide a treatment sub assembly which satisfactorily fits all bodies 52.

The arrangement of the second sealing means as shown in FIGS. 4 and 5 is not dependent on the relative sizes of these features. The buffer means permits the arrangement of FIGS. 4 and 5 to cater for differences in dimensions of features along the axis 20. Thus the treatment sub assembly 110 of FIGS. 4 and 5 can be readily utilised for retrofitting to a range of bodies 52 offered by different manufacturers.

Various other modifications may be made without departing from the scope of the invention. The various components could be made of any suitable material. For example, the body could be formed of metal or a plastics material. The chamber wall could be formed of a plastics material. The treatment material could be of any suitable material. The treatment members could be of any suitable size, shape and number, and could be mounted to the manifold by any suitable means.

Porous ceramic material such as kieselguhr as described above is utilised for the physical treatment of fluids such as water. As the fluid passes through the kieselguhr, it is filtered, so that particulate solids are removed. In another example, the treatment material could additionally or alternatively treat the fluid chemically, and could include a carbon material and/or an ion exchange material such as a resin.

There is thus provided a treatment sub assembly including a plurality of treatment members, which provides a relatively high through flow capacity for the treatment of a fluid such as water. The treatment sub assembly can be quickly and easily replaced within the treatment assembly, reducing system downtime and maintenance costs.

Whilst endeavouring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

The invention claimed is:

1. A treatment assembly, the treatment assembly defining a treatment chamber, the treatment assembly including a treatment sub assembly positioned in an assembled condition in the treatment chamber, the treatment sub assembly including a plurality of treatment members, the assembly being arranged so that in use a fluid for treatment flows through the treatment members, the treatment assembly including a body and a chamber wall, the body and the chamber wall together defining the treatment chamber, the body defining inlet and outlet passages for communicating fluid to and from the treatment chamber, the treatment sub assembly including second mounting means for releasably mounting the treatment sub assembly to the body, the treatment sub assembly including a manifold which defines a manifold chamber and is so arranged that the fluid flows through the treatment members and the manifold chamber, the treatment sub assembly including first mounting means for releasably mounting each treatment member to the manifold, and which permit direct communication of the fluid between each of the treatment members and the manifold chamber, the second mounting means including a support member extending from the manifold along an axis of the treatment sub assembly, the second mounting means including a resilient buffer member located at an end of the support member away from the manifold, and the treatment sub assembly including first sealing means for sealing between the treatment sub assembly and the body, the first sealing means includes a first resilient sealing member, wherein the treatment sub assembly is arranged so that the first resilient sealing member is compressed along the direction of engagement of the treatment sub assembly with the body in the assembled condition, and the resilient buffer member is compressed axially in the assembled condition.

2. An assembly according to claim 1, in which the treatment members are arranged radially around the axis.

3. An assembly according to claim 1, in which the first mounting means includes first spigot formations, one first spigot formation projecting from each of the treatment members, and a plurality of first socket formations which are formed by the manifold, and in which the first spigot formations are receivable.

4. An assembly according to claim 1, in which the treatment sub assembly includes second sealing means for sealing between each treatment member and the manifold, the second sealing means including a plurality of second resilient sealing members.

5. An assembly according to claim 1, in which the treatment assembly includes wall mounting means for releasably mounting the chamber wall to the body.

6. An assembly according to claim 1, in which, the second mounting means includes a second spigot formation, the body including a second socket formation which receives the second spigot formation.

7. An assembly according to claim 1, in which the chamber wall includes a locating formation, the locating formation locating an end of the support member in the assembled condition.

8. A treatment sub assembly for positioning in an assembled condition within a treatment chamber defined by a treatment assembly, the treatment sub assembly including a plurality of treatment members, the assembly being arranged so that in use a fluid for treatment flows through the treatment members, the treatment assembly including a body and a chamber wall, the body and the chamber wall together defining the treatment chamber, the body defining inlet and outlet passages for communicating fluid to and from the treatment chamber, the treatment sub assembly including second mounting means for releasably mounting the treatment sub assembly to the body, the treatment sub assembly including a manifold which defines a manifold chamber and is so arranged that the fluid flows through the treatment members and the manifold chamber, the treatment sub assembly including first mounting means for releasably mounting each treatment member to the manifold, and which permit direct communication of the fluid between each of the treatment members and the manifold chamber, the second mounting means including a support member extending from the manifold along an axis of the treatment sub assembly, the second mounting means including a resilient buffer member located at an end of the support member away from the manifold, and the treatment sub assembly including first sealing means for sealing between the treatment sub assembly and the body, the first sealing means includes a first resilient sealing member, wherein the treatment sub assembly is arranged so that the first resilient sealing member is compressed along the direction of engagement of the treatment sub assembly with the body in the assembled condition, and the resilient buffer member is compressed axially in the assembled condition.

* * * * *